United States Patent [19]

Yamawaki

[11] Patent Number: 5,159,543
[45] Date of Patent: Oct. 27, 1992

[54] INTERFACE CIRCUIT INCLUDING DC/DC CONVERTER

[75] Inventor: Tatsushi Yamawaki, Tokyo, Japan

[73] Assignee: NEC Corporation, Tokyo, Japan

[21] Appl. No.: 812,114

[22] Filed: Dec. 20, 1991

[30] Foreign Application Priority Data

Dec. 20, 1990 [JP] Japan .................................. 2-413065

[51] Int. Cl.⁵ .............................................. H02M 3/18
[52] U.S. Cl. ..................................... 363/60; 307/110
[58] Field of Search .................... 363/59, 60; 320/1; 307/110

[56] References Cited

U.S. PATENT DOCUMENTS

| | | | |
|---|---|---|---|
| 4,488,061 | 12/1984 | Mukawa et al. | 363/60 X |
| 4,839,787 | 6/1989 | Kojima et al. | 363/60 |
| 4,888,677 | 12/1989 | Grimm et al. | 363/60 |
| 4,922,402 | 5/1990 | Olivo et al. | 363/60 |
| 4,926,354 | 5/1990 | Pattantyus | 363/60 X |
| 5,008,799 | 4/1991 | Montalvo | 363/60 |

FOREIGN PATENT DOCUMENTS 2020924 11/1979 United Kingdom .................. 363/60

Primary Examiner—Steven L. Stephan
Assistant Examiner—Ed To
Attorney, Agent, or Firm—Whitham & Marhoefer

[57] ABSTRACT

In an interface circuit including a transmitting and receiving circuit which operates with an electric voltage supplying source composed of a DC/DC converter, the DC/DC converter includes a signal generation circuit generating a first signal having a first frequency, and a second signal having a second frequency lower than the first frequency, a comparator for comparing the elevated voltage with a reference voltage, and a selector for selecting one of the first and second signals and supplying the selected signal as the switching clock to the DC/DC converter. The selector is controlled by the comparator so as to supply the first signal as the switching clock to the DC/DC converter when the DC/DC converter is powered on, and to supply the second signal as the switching clock to the DC/DC converter when an absolute value of the elevated output voltage reaches the reference voltage.

7 Claims, 2 Drawing Sheets

INTERFACE CIRCUIT INCLUDING DC/DC CONVERTER

BACKGROUND OF THE INVENTION

1. Field of the Invention

The present invention relates to an interface circuit which can be used in a RS232C or RS232D serial interface circuit adapted to transmit and receive serial data, and more specifically to such an interface circuit comprising as an electric voltage source a DC/DC converter configured to generate positive and negative elevated voltages from a single electric power source.

2. Description of Related Art

Conventionally, a single power source type interface circuit includes, as an electric voltage supplying source, a DC/DC converter, which is now mainly of a so called charge pump type.

This charge pump type DC/DC converter is configured to be driven with a clock signal. When this DC/DC converter is incorporated in a data terminal instrument, the interface is constructed such that in case of no data transmission, an oscillator supplying the clock to the DC/DC converter is stopped so as to cause the charge pump type DC/DC converter to stop its function, for the purpose of saving the power consumption.

On the other hand, in portable data terminal instruments such as a handy terminal driven with a battery cell, a consumed electric power is an important problem in a real time communication. Because of this reason, it is ideally desired to stop the DC/DC converter in case of no communication and to immediately start the DC/DC converter at the time of transmitting data so that a data communication is rapidly performed. However, in the DC/DC converter incorporated in the conventional serial interface circuit for RS232C and others, since the oscillation frequency of the oscillator is fixed to one kind, both of a delay of a supply starting time of the elevated output voltage and an increase of the consumed electric power could not overcome, since they are demands conflicting with each other.

Namely, if the oscillation frequency is high, a through current increases in the DC/DC converter which is generally constituted of CMOS circuits, and therefore, the consumed electric power increases. This is a fatal problem in the battery cell driven device such as the handy terminal.

On the other hand, if the oscillation frequency is low, an electric charge accumulation is delayed in a charge pump circuit of the DC/DC converter, and therefore, the supply start of the elevated output voltage is delayed. Namely, a real time communication cannot be executed until the elevated output voltage becomes stable. In this case, it was a conventional practice to cause the DC/DC converter to ceaselessly operate in the case of the real time communication.

SUMMARY OF THE INVENTION

Accordingly, it is an object of the present invention to provide an interface circuit which has overcome the above mentioned defect of the conventional one.

Another object of the present invention is to provide an interface circuit including a DC/DC converter as an electric voltage supplying source, which has a reduced consumed electric power and which can speed up the start of the communication.

The above and other objects of the present invention are achieved in accordance with the present invention by an interface circuit including a transmitting and receiving circuit which operates with an electric voltage supplying source composed of a DC/DC converter configured to receive an input DC voltage and to generate elevated positive and negative DC voltages, the DC/DC converter including means generating two oscillation output signals having different frequencies, means for comparing a selected one of the elevated positive and negative voltages with a reference voltage, and means operating based on the result of comparison of the comparing means for selecting one of the two oscillation output signals and supplying the selected oscillation output as a switching clock to the DC/DC converter.

With the above mentioned arrangement, at the time of starting the data communication, namely, after the data communication is started until the elevated output voltage becomes stable, the clock having a high frequency is supplied to the DC/DC converter as the switching clock, and in a steady communication after the elevated output voltage has become stable, the clock having a low frequency is supplied to the DC/DC converter as the switching clock. Therefore, the output voltage quickly rise up at the time of starting the data communication, and the electric power consumption is low in the steady communication. Accordingly, since it is possible to stop the DC/DC converter in case of no communication, the electric power consumption in case of no communication can be reduced.

The above and other objects, features and advantages of the present invention will be apparent from the following description of preferred embodiments of the invention with reference to the accompanying drawings.

DESCRIPTION OF THE PREFERRED EMBODIMENTS

Figure 1:
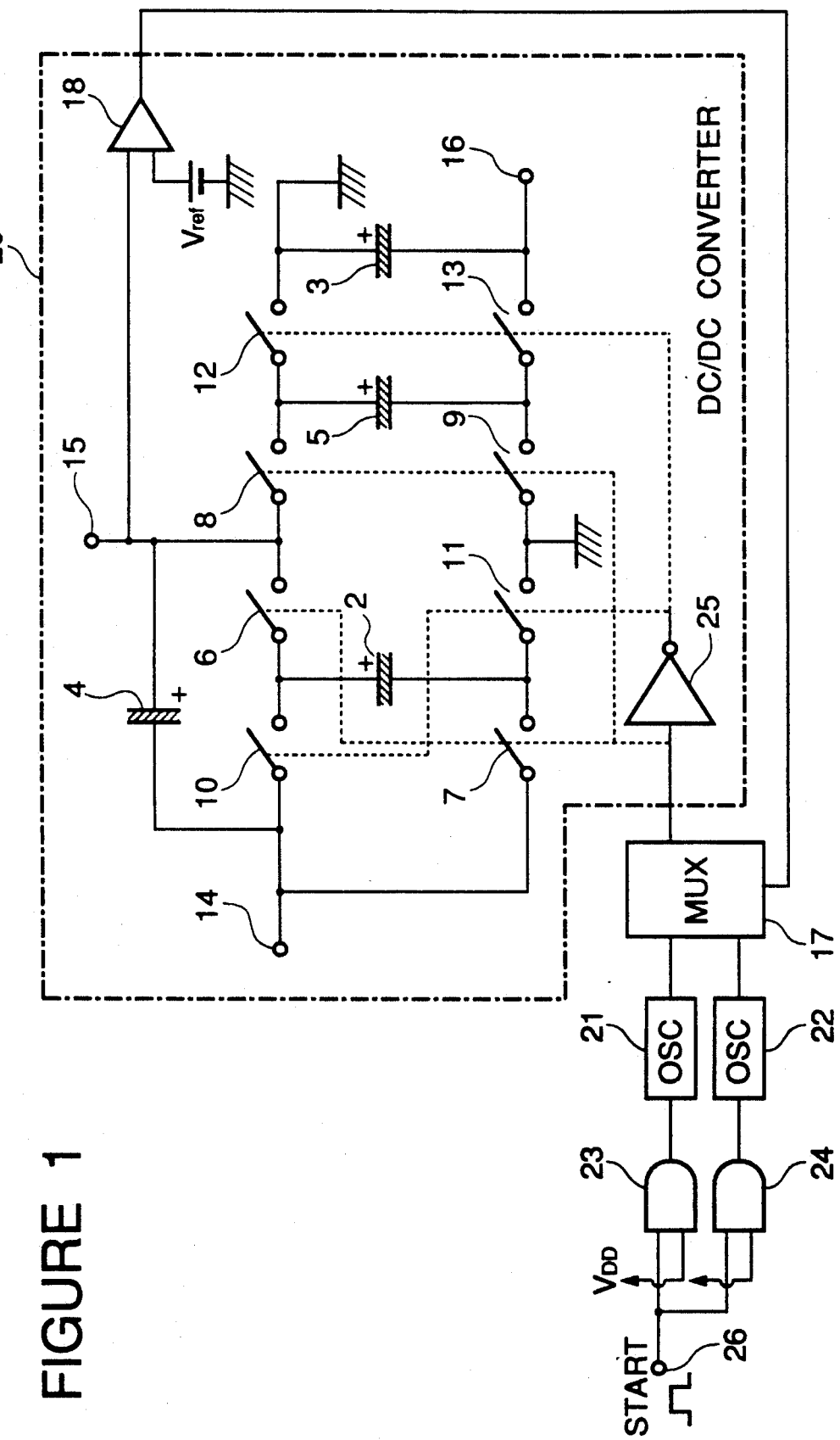
FIG. 1 is a block diagram of an essential part of a first embodiment of the interface circuit in accordance with the present invention.

Referring to FIG. 1, there is shown a block diagram of an essential part of a first embodiment of the interface circuit in accordance with the present invention.

The shown interface circuit includes a DC/DC converter 20, which comprises capacitors 2 to 5, transistor switches 6 to 13, an inverter 25 and a comparator 18. An input DC voltage (supplied from a single electric source, for example a battery cell internally provided in a handy data terminal) is supplied to an input voltage terminal 14, and on the other hand, an elevated output voltage can be obtained from each of output terminals 15 and 16.

The input voltage terminal 14 is connected to one end of each of the capacitor 4 and the transistor switches 7 and 10, and the other end of the capacitor 4 is connected to the output terminal 15. The other end of the transistor switch 10 is connected to one end of the capacitor 2 and one of the transistor switch 6, and the other end of the transistor switch 7 is connected to the other end of the capacitor 2 and one end of the transistor switch 11. The other end of the transistor switch 6 is connected to the output terminal 15 and one end of the transistor switch 8, and the other end of the transistor switch 11 is connected to ground and one end of the transistor switch 9. The other end of the transistor switch 8 and the other end of the transistor switch 9 are connected to opposite ends of the capacitor 5, respectively, and also connected to opposite ends of the capacitor 3 through the transistor switches 12 and 13, respectively. On end of the capacitor 3 connected to the transistor switch 12 is grounded, and the other end of the capacitor 3 is connected to the output terminal 16.

In addition, the output terminal 15 is connected to one input of the comparator 18, having its other input connected to a reference voltage Vref. The transistor switches 6, 7, 8 and 9 are on-off controlled by an input of the inverter 25, and the transistor switches 10, 11, 12 and 13 are on-off controlled by an output of the inverter 25, so that when the transistor switches 6, 7, 8 and 9 are turned off, the transistor switches 10, 11, 12 and 13 are turned on, and when the transistor switches 6, 7, 8 and 9 are turned on, the transistor switches 10, 11, 12 and 13 are turned off.

Assuming that a voltage V is applied to the input terminal 14, when the transistor switches 10, 11, 12 and 13 are turned on and the transistor switches 6, 7, 8 and 9 are turned off, the voltage V charges the capacitor 2. Thereafter, when the transistor switches 6, 7, 8 and 9 are turned on and the transistor switches 10, 11, 12 and 13 are turned off, the voltage V applied to the input terminal 14 plus a voltage charged in the capacitor 2 are applied to charged each of the capacitor 4 and the capacitor 5. When the transistor switches 10, 11, 12 and 13 are turned on and the transistor switches 6, 7, 8 and 9 are turned off, again, a voltage charged in the capacitor 5 is transferred to the capacitor 3, and the capacitor 2 is charged with the voltage V applied to the terminal 14, again. The above mentioned operation is repeated by the switching clock applied to the inverter 25, so that the voltage accumulated in each of the capacitor 4 and the capacitor 5 gradually increases and become stable when the voltage across each of the capacitor 4 and the capacitor 5 has become twice the voltage V applied to the input terminal 14.

Thus, when $+5$ V is supplied to the input terminal 14 from the signal electric source, $+10$ V is outputted from the output terminal 15 and $-10$ V is outputted from the output terminal 16.

The shown circuit includes a pair of oscillator circuit 21 and 22 having different oscillation frequencies. Specifically, the oscillation frequency of the oscillator circuit 21 is higher than that of the oscillator circuit 22. A communication start signal is supplied from a communication start signal input terminal 26 to the respective oscillator circuits 21 and 22 through AND gates 23 and 24, respectively. Outputs of the oscillator circuits 21 and 22 are supplied to a multiplexor 17 controlled by an output of the comparator 18, so that either one of the outputs of the oscillator circuits 21 and 22 is selected by the multiplexor 17 and supplied to the input of the inverter 25.

The AND gates 23 and 24 are connected to receive at their other input a voltage supply voltage $V_{DD}$ of the system, so that after the voltage supply voltage $V_{DD}$ of the system is raised, application of the communication start signal from the terminal 26 to each of the oscillator circuits 21 and 22 is validated.

In case of no communication, since the communication start signal is not supplied to the terminal 26, the oscillator circuits 21 and 22 and the DC/DC converter 20 are in a stopped condition. When the communication is started, the first oscillator circuit 21 having the high oscillation frequency is selected by the multiplexor 17 in order to rapidly raise the output voltage of the DC/DC converter 20. Namely, at the time of starting the communication, since the output voltage of the output terminal 15 does not reach a standard voltage of the DC/DC converter, namely, the reference voltage Vref, the comparator 18 controls the multiplexor 17 so as to select the output of the first oscillator circuit 21, so that the DC/DC converter 20 uses the output of the first oscillator circuit 21 as the switching clock. Thereafter, when the output voltage of the output terminal 15 reaches the reference voltage Vref, the output of the comparator 18 is inverted to control the multiplexor 17 so as to cause, it to select the output of the second oscillator circuit 22, so that the DC/DC converter 20 uses the output of the second oscillator circuit 22 having a low frequency as the switching clock.

With the above mentioned arrangement, in case of no communication, an unnecessary DC/DC converter 20 is stopped in order to save the electric power consumption. Only during an initial period at the time of starting the data communication, the DC/DC converter is driven with a high frequency, so that the output voltage of the DC/DC converter is rapidly raised. However, after the output voltage of the DC/DC converter has reached the standard voltage and has become stable, the DC/DC converter is driven with a low frequency, for the purpose of saving the electric power consumption.

Accordingly, the DC/DC converter which had been conventionally required to be maintained to ceaselessly operate in the case of the real time communication, can be stopped at the time of no communication. Therefore, the power consumption of the interface circuit such as the RS232C serial interface circuit can be remarkably reduced.

Figure 2:
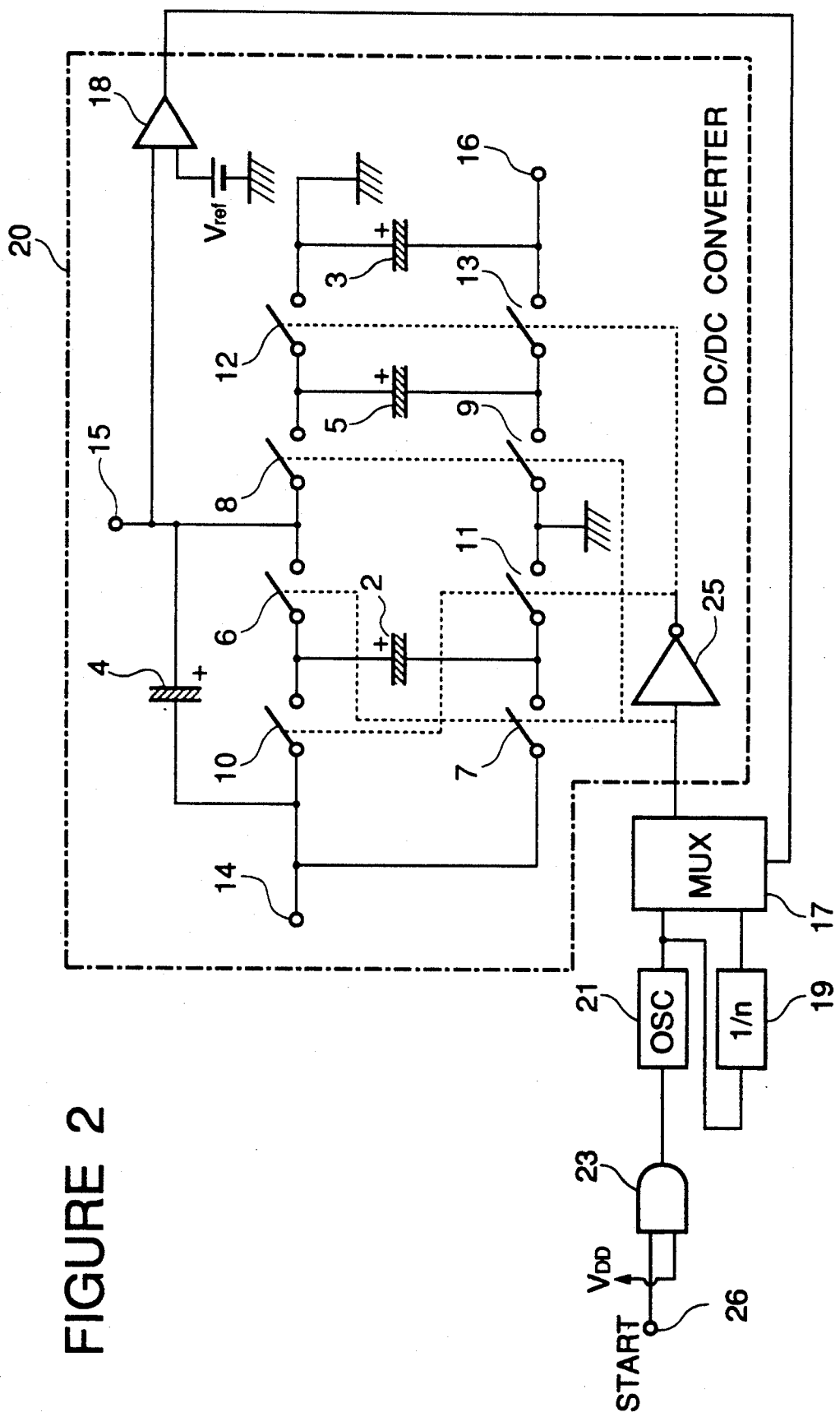
FIG. 2 is a diagram similar to that of FIG. 1 but showing a second embodiment of the interface circuit in accordance with the present invention.

Referring to FIG. 2, there is shown another embodiment of the interface circuit in accordance with the present invention. In FIG. 2, elements similar to those shown in FIG. 1 are given the same Reference Numerals, and therefore, explanation thereof will be omitted.

As seen from comparison between FIGS. 1 and 2, the second embodiment is characterized in that only the oscillator circuit 21 is used, and a frequency divider 19 is used in place of the second oscillator 22. The frequency divider 19 is connected to receive the output of the first oscillator circuit 21 and to output a frequency-divided signal to the multiplexor 17 in place of the output of the second oscillator circuit 22.

Since one oscillator is omitted, the circuit construction of the second embodiment can be simplified in comparison with the first embodiment.

The invention has thus been shown and described with reference to the specific embodiments. However, it should be noted that the present invention is in no way limited to the details of the illustrated structures but changes and modifications may be made within the scope of the appended claims. For example, in place of the two oscillator circuit 21 and 22, an variable frequency oscillator can be used which is configured to change its oscillation frequency on the basis of the output of the comparator 18.

I claim:

1. An interface circuit including a transmitting and receiving circuit which operates with an electric voltage supplying source composed of a DC/DC converter configured to receive an input DC voltage and to generate elevated positive and negative DC voltages, said DC/DC converter including means for generating two oscillation output signals having different frequencies, means for comparing a selected one of said elevated positive and negative voltages with a reference voltage, and means operating based on the result of comparison of said comparing means for selecting one of said two oscillation output signals and supplying the selected oscillation output as a switching clock to the DC/DC converter.

2. An interface circuit claimed in claim 1 wherein said generating means generates a first signal having a first frequency, and a second signal having a second frequency lower than said first frequency, and said selecting means is configured to supply said first signal as the switching clock to the DC/DC converter when the DC/DC converter is powered on, and to supply said first signal as the switching clock to the DC/DC converter when said selected one of said elevated positive and negative voltages reaches said reference voltage.

3. An interface circuit claimed in claim 2 wherein said generating means includes a first oscillator generating said first signal, and a second oscillator generating said second signal.

4. An interface circuit claimed in claim 2 wherein said generating means includes an oscillator generating said first signal, and a frequency divider receiving said first signal so as to generate said second signal.

5. A DC/DC converting circuit comprising a DC/DC converter configured to receive an input DC voltage and driven with a switching clock so as to output an elevated DC voltage, means for generating a first signal having a first frequency, and a second signal having a second frequency lower than said first frequency, means for comparing said elevated DC voltage with a reference voltage, and means for receiving said first and second signals and controlled by said comparing means so as to supply said first signal as the switching clock to the DC/DC converter when the DC/DC converter is powered on, and to supply said second signal in place of said first signal, as the switching clock to the DC/DC converter when an absolute value of said elevated output voltage reaches said reference voltage.

6. A DC/DC converting circuit claimed in claim 5 wherein said generating means includes a first oscillator generating said first signal, and a second oscillator generating said second signal.

7. A DC/DC converting circuit claimed in claim 5 wherein said generating means includes an oscillator generating said first signal, and a frequency divider receiving said first signal so as to generating said second signal.

* * * * *